(12) United States Patent
Finegan

(10) Patent No.: US 10,481,570 B1
(45) Date of Patent: *Nov. 19, 2019

(54) SYSTEM AND METHOD FOR PROPAGATING CONTROL RESULTS IN AN ENTERPRISE

(71) Applicant: RESOLVER INC., Sunnyvale, CA (US)

(72) Inventor: Steven Finegan, San Francisco, CA (US)

(73) Assignee: RESOLVER INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,984

(22) Filed: Jun. 12, 2018

Related U.S. Application Data

(63) Continuation of application No. 14/578,262, filed on Dec. 19, 2014, now Pat. No. 9,996,064.

(60) Provisional application No. 61/918,658, filed on Dec. 19, 2013.

(51) Int. Cl.
*G05B 15/02* (2006.01)

(52) U.S. Cl.
CPC .................................. *G05B 15/02* (2013.01)

(58) Field of Classification Search
CPC ..................................................... G05B 15/02
See application file for complete search history.

(56) References Cited

U.S. PATENT DOCUMENTS

| | | | |
|---|---|---|---|
| 9,996,064 B1* | 6/2018 | Finegan | G06Q 10/0639 |
| 2006/0155778 A1* | 7/2006 | Sharma | G06F 16/2246 |
| 2006/0218301 A1* | 9/2006 | O'Toole | H04L 12/185 709/244 |
| 2009/0240823 A1* | 9/2009 | Rider | H04L 63/10 709/229 |
| 2012/0331486 A1* | 12/2012 | Bhattacharyya | G06Q 10/0631 719/318 |
| 2014/0058799 A1* | 2/2014 | Gottemukkala | G06Q 10/06 705/7.37 |
| 2018/0364654 A1* | 12/2018 | Locke | G05B 13/0265 |

* cited by examiner

*Primary Examiner* — Vincent H Tran
(74) *Attorney, Agent, or Firm* — Minisandram Law Firm; Raghunath S. Minisandram

(57) ABSTRACT

System and method for propagating control results in an environment is disclosed. At least one control for compliance is designated for an entity. The entity complies with the at least one control and the result is measured to generate a control result, the control result stored in a data store. The generated control result is selectively designated for propagation in an enterprise management system. The enterprise management system is configured to propagate the designated generated control result to another entity, based on the selective designation. The designation of propagation of control result is based on a relationship between the entity and another entity.

20 Claims, 14 Drawing Sheets

| From Type | To Type | Propagate Control Results | Propagate Risk Score | Inherit Criticality |
|---|---|---|---|---|
| Entity Collection | Member of Entity Collection | YES | YES | NO |
| Member of Entity Collection | Entity Collection | NO | NO | NO |
| Member of Program | Program | NO | NO | NO |
| Program | Member of Program | YES | YES | YES |
| Parent of | Child of | YES | YES | Yes |
| Child of | Parent of | NO | NO | NO |
| Provides | Consumes | YES | YES | NO |
| Consumes | Provides | NO | NO | NO |

FIGURE 2A

| Control/Subcontrol | Result | Propagate Externally |
|---|---|---|
| RA-1 Risk Assessment Policy and Procedures | | |
| RA-1.1 | Pass | √ |
| RA-1.2 | Pass | √ |
| RA-2 Security Categorization | | |
| RA 2.1 | Fail | √ |
| RA-3 Risk Assessment | | |
| RA-3.1 | Pass | √ |

PUBLISHED CONTROL RESULTS FOR ORGANIZATIONAL ENTITY

FIGURE 3

| Control/Subcontrol | Result | Originating Source | Direct Source |
|---|---|---|---|
| RA-1 Risk Assessment Policy and Procedures | | | |
| RA-1.1 | Pass | Organizational Entity | Organizational Entity |
| RA-1.2 | Pass | Organizational Entity | Organizational Entity |
| RA-2 Security Categorization | | | |
| RA-2.1 | Fail | Organizational Entity | Organizational Entity |
| RA-3 Risk Assessment | | | |
| RA-3.1 | Pass | Organizational Entity | Organizational Entity |

INHERITED CONTROL RESULTS FOR ACTIVE DIRECTORY ENTITY COLLECTION

FIGURE 4

| Control/Subcontrol | Result | Propagate Externally | Propagate Internally |
|---|---|---|---|
| AC-01 Access Control Policy and Procedures | | | |
| AC-1.1 | Pass | | |
| AC-1.2 | Pass | | ✓ |
| AC-02 Account Management | | | |
| AC-2.1 | Pass | ✓ | ✓ |
| AC-2.E1 | Fail | ✓ | ✓ |
| AC-2.E2 | Pass | ✓ | |
| AC-03 Access Enforcement | | | |
| AC-3.1 | Pass | ✓ | ✓ |
| AC-3.E2 | Fail | ✓ | ✓ |

PUBLISHED CONTROL RESULTS OF ACTIVE DIRECTORY ENTITY COLLECTION

FIGURE 5

| Control/Subcontrol | Result | Originating Source | Direct Source |
|---|---|---|---|
| AC-01 Access Control Policy and Procedures | | | |
| AC-1.1 | | | |
| AC-1.2 | | | |
| AC-02 Account Management | | | |
| AC-2.1 | Pass | Active Directory | Active Directory |
| AC-2.E1 | Fail | Active Directory | Active Directory |
| AC-2.E2 | Pass | | |
| AC-03 Access Enforcement | | | |
| AC-3.1 | Pass | Active Directory | Active Directory |
| AC-3.E2 | Fail | Active Directory | Active Directory |
| RA-1 Risk Assessment Policy and Procedures | | | |
| RA-1.1 | Pass | Organizational Entity | Organizational Entity |
| RA-1.2 | Pass | Organizational Entity | Organizational Entity |
| RA-2 Security Categorization | | | |
| RA 2.1 | Fail | Organizational Entity | Organizational Entity |
| RA-3 Risk Assessment | | | |
| RA-3.1 | Pass | Organizational Entity | Organizational Entity |

INHERITED CONTROL RESULTS OF SAP FINANCIAL SYSTEM
ENTITY COLLECTION

FIGURE 6

| Control/Subcontrol | Result | Originating Source | Direct Source |
|---|---|---|---|
| AC-01 Access Control Policy and Procedures | | | |
| AC-1.1 | | | |
| AC-1.2 | | | |
| AC-02 Account Management | | | |
| AC-2.1 | Pass | Active Directory | SAP Financial System |
| AC-2.E1 | Fail | Active Directory | SAP Financial System |
| AC-2.E2 | Pass | Active Directory | SAP Financial System |
| AC-03 Access Enforcement | | | |
| AC-3.1 | Pass | Active Directory | SAP Financial System |
| AC-3.E2 | Fail | Active Directory | SAP Financial System |
| RA-1 Risk Assessment Policy and Procedures | | | |
| RA-1.1 | Pass | Organizational Entity | SAP Financial System |
| RA-1.2 | Pass | Organizational Entity | SAP Financial System |
| RA-2 Security Categorization | | | |
| RA-2.1 | Fail | Organizational Entity | SAP Financial System |
| RA-3 Risk Assessment | | | |
| RA-3.1 | Pass | Organizational Entity | SAP Financial System |

INHERITED CONTROL RESULTS FOR SAP SERVER ENTITY

FIGURE 7

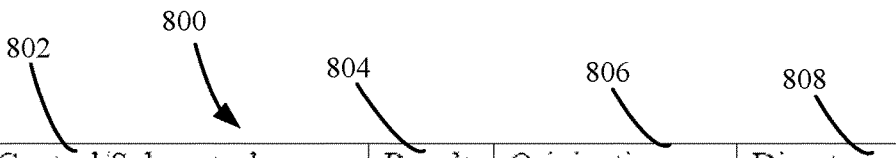

| Control/Subcontrol | Result | Originating Source | Direct Source |
|---|---|---|---|
| AC-01 Access Control Policy and Procedures | | | |
| AC-1.1 | Pass | Active Directory | Active Directory |
| AC-1.2 | Pass | Active Directory | Active Directory |
| AC-02 Account Management | | | |
| AC-2.1 | Pass | Active Directory | Active Directory |
| AC-2.E1 | Fail | Active Directory | Active Directory |
| AC-2.E2 | Pass | | |
| AC-03 Access Enforcement | | | |
| AC-3.1 | Pass | Active Directory | Active Directory |
| AC-3.E2 | Fail | Active Directory | Active Directory |
| RA-1 Risk Assessment Policy and Procedures | | | |
| RA-1.1 | Pass | Organizational Entity | Active Directory |
| RA-1.2 | Pass | Organizational Entity | Active Directory |
| RA-2 Security Categorization | | | |
| RA 2.1 | Fail | Organizational Entity | Active Directory |
| RA-3 Risk Assessment | | | |
| RA-3.1 | Pass | Organizational Entity | Active Directory |

INHERITED CONTROL RESULTS FOR SF DOMAIN CONTROLLER ENTITY
FIGURE 8

| Control/Subcontrol | Result | Originating Source | Direct Source | REVOKE |
|---|---|---|---|---|
| AC-01 Access Control Policy and Procedures | | | | |
| AC-1.1 | Pass | Active Directory | Active Directory | |
| AC-1.2 | Pass | Active Directory | Active Directory | |
| AC-02 Account Management | | | | |
| AC-2.1 | Pass | Active Directory | Active Directory | Yes |
| AC-2.E1 | Fail | Active Directory | Active Directory | |
| AC-2.E2 | Pass | | | |
| AC-03 Access Enforcement | | | | |
| AC-3.1 | Pass | Active Directory | Active Directory | |
| AC-3.E2 | Fail | Active Directory | Active Directory | |
| RA-1 Risk Assessment Policy and Procedures | | | | |
| RA-1.1 | Pass | Organizational Entity | Active Directory | |
| RA-1.2 | Pass | Organizational Entity | Active Directory | |
| RA-2 Security Categorization | | | | |
| RA 2.1 | Fail | Organizational Entity | Active Directory | |
| RA-3 Risk Assessment | | | | |
| RA-3.1 | Pass | Organizational Entity | Active Directory | |

INHERITED CONTROL RESULTS FOR SF DOMAIN CONTROLLER ENTITY

FIGURE 8A

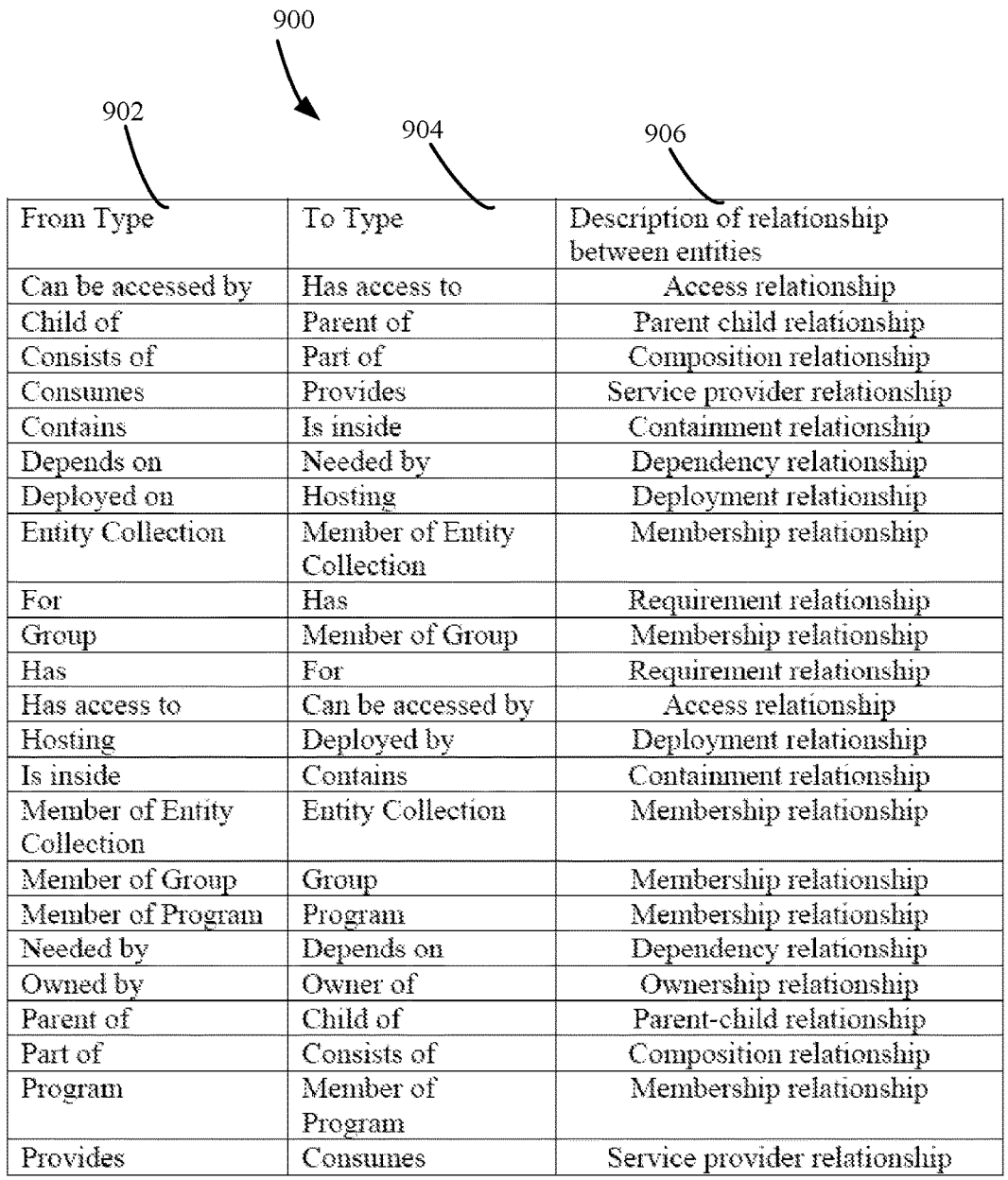

| From Type | To Type | Description of relationship between entities |
|---|---|---|
| Can be accessed by | Has access to | Access relationship |
| Child of | Parent of | Parent child relationship |
| Consists of | Part of | Composition relationship |
| Consumes | Provides | Service provider relationship |
| Contains | Is inside | Containment relationship |
| Depends on | Needed by | Dependency relationship |
| Deployed on | Hosting | Deployment relationship |
| Entity Collection | Member of Entity Collection | Membership relationship |
| For | Has | Requirement relationship |
| Group | Member of Group | Membership relationship |
| Has | For | Requirement relationship |
| Has access to | Can be accessed by | Access relationship |
| Hosting | Deployed by | Deployment relationship |
| Is inside | Contains | Containment relationship |
| Member of Entity Collection | Entity Collection | Membership relationship |
| Member of Group | Group | Membership relationship |
| Member of Program | Program | Membership relationship |
| Needed by | Depends on | Dependency relationship |
| Owned by | Owner of | Ownership relationship |
| Parent of | Child of | Parent-child relationship |
| Part of | Consists of | Composition relationship |
| Program | Member of Program | Membership relationship |
| Provides | Consumes | Service provider relationship |

FIGURE 9 ns, the same components have the same reference numerals. The illustrated embodiments are intended to illustrate but not limit the invention. The drawings include the following figures:

FIG. 1 shows an example enterprise with a plurality of entities and entity collections, according to one aspect of the present disclosure;

FIG. 2 shows an example organizational entity, showing relationships with entity collections and indirect relationships with other entities, according an aspect of the present disclosure;

FIG. 2A shows an example configuration table, according to an aspect of the present disclosure;

FIG. 3 shows published control results for the organizational entity, according to an aspect of the present disclosure;

FIG. 4 shows inherited control results of an example Active Directory entity collection, according to an aspect of the present disclosure;

FIG. 5 shows published control results of the example Active Directory entity collection, according to an aspect of the present disclosure;

FIG. 6 shows inherited control results for an example SAP Financial System entity collection, according to an aspect of the present disclosure;

FIG. 7 shows inherited control results for the example SAP Server entity, according to an aspect of the present disclosure;

FIG. 8 shows inherited control results for an example SF Domain Controller, according to an aspect of the present disclosure;

FIG. 8A shows an example revocation of a control result by the SF Domain Controller, according to an aspect of the present disclosure;

FIG. 9 shows an example relationship table, according to an aspect of the present disclosure;

FIG. 10 shows an example enterprise management system, according to an aspect of the present disclosure;

FIG. 11 shows an example network environment, according to an aspect of the present disclosure; and FIG. 12 shows an example flow diagram, according to one aspect of the present disclosure.

SYSTEM AND METHOD FOR PROPAGATING CONTROL RESULTS IN AN ENTERPRISE

RELATED APPLICATION

This application is a continuation application of and claims priority to U.S. patent application Ser. No. 14/578,263 filed on Dec. 19, 2014, entitled "System and method for propagating control results in a network infrastructure", which claims priority to U.S. provisional patent application No. 61/918,658 filed on Dec. 19, 2013, entitled "System and method for propagating control results in a network infrastructure". U.S. patent application Ser. No. 14/578,263 and 61/918,658 are incorporated herein by reference, in their entirety.

TECHNICAL FIELD

The present invention relates generally to an enterprise management system and more specifically, to propagating control results in an enterprise.

DESCRIPTION OF RELATED ART

Enterprise management may involve a plurality of attributes. In some examples, enterprise management may involve governance, risk and compliance management aspects. An enterprise may include a plurality of entities, and there may be different needs for enterprise management, based in part on the types of entities and entity collections utilized by the enterprise.

It may be beneficial to provide an enterprise management system that can address various needs related to the entities and entity collections in the enterprise. With these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment a method for propagating control results in an enterprise is disclosed. A control result for propagation by an entity is selectively designated. The designated control result is then propagated to another entity. In some examples, the designation of propagation of control results is based on a relationship between the entity and another entity.

In yet another embodiment, a system for propagating control results is disclosed. The system includes an entity with a data store to store selective designation of a control result for propagation. The entity is configured to propagate the designated control result to another entity. In some examples, the designation of propagation of control results is based on a relationship between the entity and another entity.

This brief summary is provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are described with reference to the drawings. In the draw-

DETAILED DESCRIPTION

To facilitate an understanding of the adaptive aspects of the present disclosure, an example enterprise will be described. The specific construction and operation of the adaptive aspects of propagating control results in the enterprise are described with reference to the example enterprise.

Figure 1:
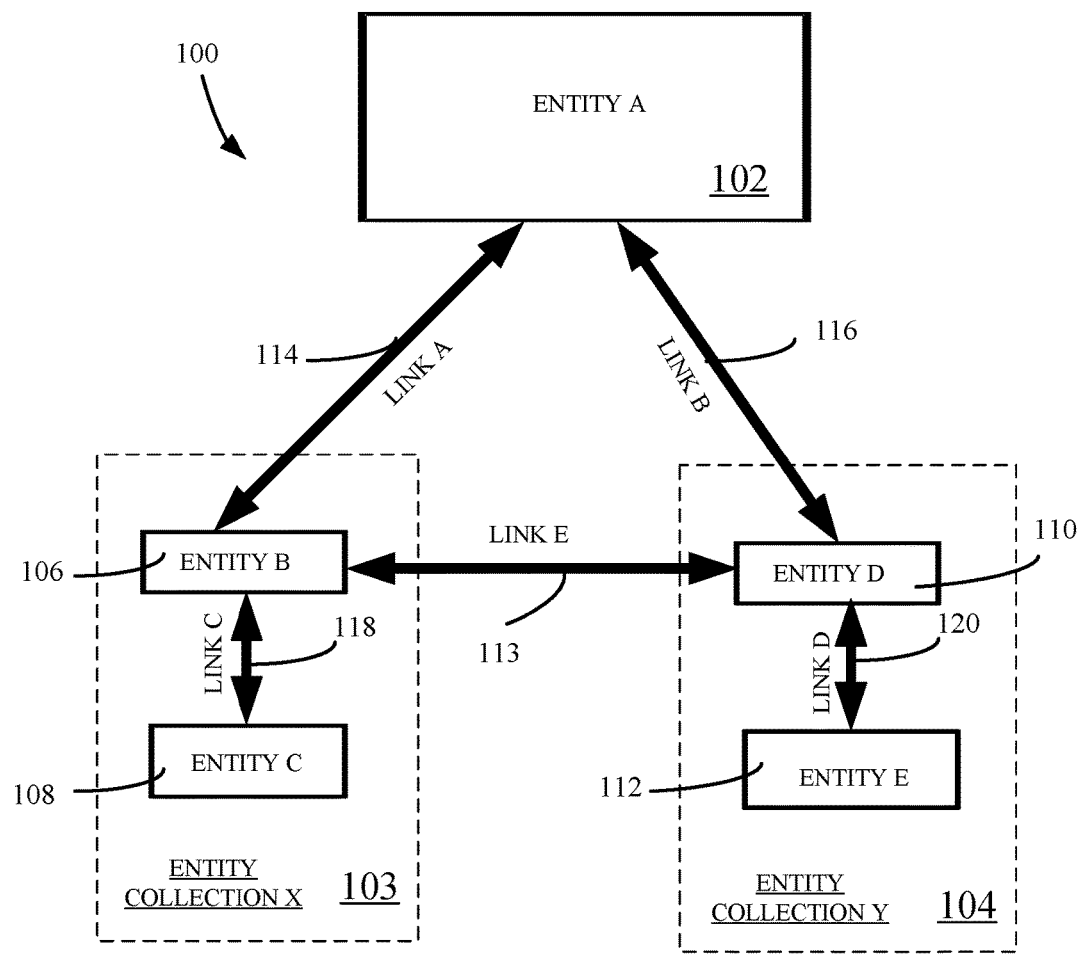

FIG. 1 shows an example enterprise. In this example, the enterprise includes a network infrastructure with a plurality of entities. One or more entities together may be part of an entity collection. In general, an entity collection and an entity within the entity collection have a relationship. This relationship may be referred to as an Entity Collection to a Member of Entity Collection relationship. Entities may also have relationships with other entities. For example, entities may have a parent-child relationship or a provider-receiver relationship. Entities may be computer systems or applications executed on computing systems. An example list of various entities and their relationships are later described in detail.

FIG. 1 shows an example enterprise 100 with a plurality of entities. Enterprise 100 in some examples may be a network infrastructure. Enterprise 100 includes entity A 102, entity collection X 103 and entity collection Y 104. Entity collection X 103 may have a plurality of entities, for example, entity B 106 and entity C 108. Entity collection Y 104 may have a plurality of entities, for example, entity D 110 and entity E 112. Entities may consist of computer systems or applications executed on computer systems. Entities may be coupled over a link (for example, a communication link) to communicate with each other.

Entity A 102 is configured to communicate with entity B 106 over link A 114. Entity A 102 is also configured to communicate with entity D 110 over link B 116. Entity A 102 and entity B 106 have a parent-child relationship. Entity A 102 and entity D 110 also have a parent-child relationship. For example, Entity A 102 is the parent and Entity D 110 is the child.

Entity B 106 is configured to communicate with entity C 108 over link C 118. Entity B 106 and entity C 108 have a parent-child relationship. Entity D 110 is configured to communicate with entity E 112 over link D 120. Entity D 110 and entity E 112 have a parent-child relationship. For example, Entity D 110 is the parent and Entity E 112 is the child.

Entity B 106 is configured to communicate with entity D 110 over link E 113. Entity B 106 and Entity D 110 have a receiver-provider relationship. For example, Entity B 106 is the receiver of control results and Entity D 110 is the provider of control result.

Figure 2:
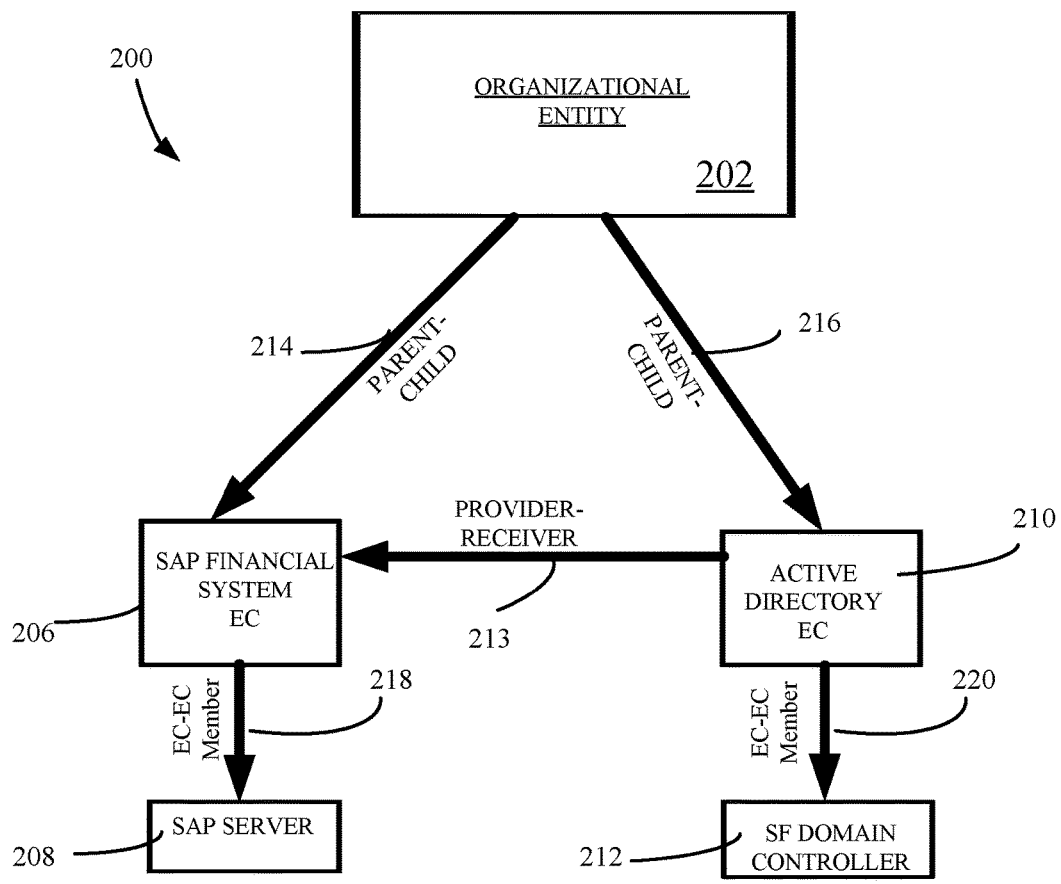

Having described an example enterprise 100 and example relationships, propagation of control results in the enterprise will now be described with reference to FIG. 2. FIG. 2 shows an enterprise 200. In some respects, enterprise 100 of FIG. 1 is similar to enterprise 200. As an example, entity A 102 in FIG. 1 may be similar to Organizational Entity 202 in FIG. 2. Entity collection X 103 may be similar to SAP Financial System 206 entity collection. Entity collection Y 104 may be similar to Active Directory 210 entity collection. Entity C 108 may correspond to SAP Server 208. Entity E 112 may correspond to SF Domain Controller 212.

FIG. 2 additionally shows the relationships between entities and entity collections. Further, Organizational Entity 202 and SAP Financial System 206 have a parent-child relationship. Further, arrow 214 shows flow of propagation of control results from a parent to a child. Similarly, Organizational Entity 202 and Active Directory 210 have a parent-child relationship. Further, arrow 216 shows flow of propagation of control results from a parent to a child. Active Directory 210 and SAP Financial System 206 have a provider-receiver relationship. Further, arrow 213 shows the flow of propagation of control results from a provider to a receiver. Now, referring to SAP Financial System 206 entity collection, we notice that SAP Financial System 206 entity collection has an EC-EC Member relationship with SAP Server 208. Propagation of control results is shown by arrow 218. Now, referring to Active Directory 210 entity collection, the Active Directory 210 entity collection has an EC-EC Member relationship with SF Domain Controller 212.

FIG. 2 will be used to describe the propagation of control results in the enterprise. FIG. 2 shows the Organizational Entity 202, which contains the control results for several risk and compliance assessment-related controls. As previously described, Organizational Entity 202 and SAP Financial System 206 have a parent-child relationship. Similarly, Organizational Entity 202 and Active Directory 210 have a parent-child relationship. This example uses NIST 800-53 controls as the controls that are being measured for compliance, but any set of controls can be used. The results from these controls will be propagated to recipients, for example, entities and entity collections, which will inherit these results.

The process of propagating control results starts with the entities (an entity represents any object, such as a computer, application, person, or place that can be measured for compliance or risk) or entity collections (an entity collection is an object that is intended to represent a group of entities, and is typically used to represent an information system, but can also be used to represent other things, such as an end-to-end business process) publishing results for specific controls that other entities or entity collections can rely on. FIG. 2A shows an example configuration table 230 showing attributes for various relationships.

Now, referring to FIG. 2A, an example configuration table 230 is shown. The configuration table 230 may be used to configure attributes for various exemple relationships. Referring to table 230, column 232 shows "From Type" and column 234 shows "To Type" of a relationship. Column 236 shows whether control results are propagated from the From Type to the To Type relationship. Column 238 shows whether risk scores are propagated from the From Type to the To Type relationship. Column 240 shows whether criticality is inherited from the From Type to the To Type relationship.

Now, referring to row 242, from "Entity Collection" to "Member of Entity Collection" relationships, control results are propagated and risk score is propagated. However, Entity collection criticality is not inherited by a Member of Entity Collection. Now, referring to row 244, from a "Parent of" to a "Child of" relationship, control results are propagated from Parent to Child, risk scores are propagated from Parent to Child and criticality of Parent is inherited by the Child.

After the results are published, all entities or entity collections that have a direct relationship with the entity or entity collection that published the results will inherit the control results, provided that propagation has been enabled for the relationship and provided that they are required to meet these controls. As configured in the configuration table 230, all entities that have an indirect relationship with the entity or entity collection that is propagating control results will inherit the control results, provided that propagation is enabled for the relationship, the entities or entity collections that are in the chain between the entity propagating results and the entity with the indirect relationship with the propagating entity are required to meet the control and none of these intermediate entities have revoked the control results. This inheritance will occur automatically, but can be revoked, if an inheriting entity or entity collection decides to meet the control on its own by rejecting the inheritance of a control result.

In one example, the Organizational Entity 202 is publishing the results from the NIST 800-53 controls shown in FIG. 3, Table 300. The data in Table 300 will be associated with Organizational Entity 202. Table 300 may be stored in a data store in the Organizational Entity 202.

Now, referring to FIG. 3, table 300 shows published control results for Organizational Entity 202. For example, column 302 shows various controls, column 304 shows their corresponding results and column 306 shows whether the control results are propagated externally or not. In one example, propagated externally means that the control results get propagated for all relationships that are permitted to propagate externally. There may be some relationships that may only permit propagation of control results internally. As an example, the Entity Collection to Member of Entity Collection relationship and the Member of Entity Collection to Entity Collection relationships, only allow for results to be propagated internally.

As previously described, all of the Organizational Entity 202 has direct relationships with SAP Financial System 206 and Active Directory 210. The relationship is a Parent—Child relationship. As provided in table 230, row 244, propagation of control results is enabled for the Parent-Child relationship. Now, referring to column 306, (Propagate Externally column) the results for the controls with the √ mark have been published. The type of propagation that the Organizational Entity 202 publishes is external propagation, which means that the Organizational Entity is propagating to other entities and entity collections. For this reason, we know that any children of the Organizational Entity will inherit the published control results. In our example, this means that both Active Directory 210 and the SAP Financial System 206 will inherit the control results from the Organizational Entity 202. For example, referring to rows 308-314, control results of RA-1.1, RA-1.2, RA 2.1 and RA-3.1 will be inherited by the child. Referring to rows 308, 310 and 314, the control results for RA-1.1, RA-1.2 and RA-3.1 are "Pass". Referring to row 312, the control result for RA-2.1 is a "Fail".

Also, unless Active Directory 210 or the SAP Financial System 206 revoke any of these control results, any entities that these entity collections are related to will also receive the propagated control results from the Organizational Entity 202, provided that propagation has been enabled for these other relationships. In some examples, propagated control results are received by entities or entity collections that are required to meet the specific controls. Since the only other relationship present is the Entity Collection (EC) to Member of Entity Collection (Member of EC) relationship (as shown by arrows 220 and 218 in FIG. 2), and propagation has been enabled for this relationship, then all entities and entity collections related to both Active Directory 210 and the SAP Financial System 206 will inherit the control results from the Organizational Entity 202.

In this example, there are two components which will be also inheriting the Organizational Entity 202 control results from Active Directory 210 and the SAP Financial System 206. The SF Domain Controller 212 will inherit the control results from Active Directory 210. And, SAP Server 208 will inherit the control results from SAP Financial System 206. The inherited control results for the SAP server entity 208 are shown in FIG. 7. The inherited control results for SF Domain Controller 212 are shown in FIG. 8. These will be described later in detail.

In this example, Organizational Entity 202 does not inherit any control results. Since Organizational entity 202 is a top-level entity, there are no other entities from which it can inherit control results. FIG. 4, table 400 shows inherited control results for the Active Directory 210 entity collection.

Referring now to FIG. 4, table 400 shows inherited control results for the Active Directory 210 entity collection. For example, column 402 shows control/subcontrol, column 404 shows corresponding results, column 406 shows the Originating Source for the control result and column 408 shows the Direct Source for the control result. The Direct Source is that entity or entity collection which has the relationship with the inheriting entity or entity collection. The Originating Source is the entity or entity collection where the control is being met. The control result may be obtained by means of a questionnaire or by using one or more connectors that may automatically collect the results.

Rows 410-416 shows various controls, corresponding results, the originating source and the direct source. In this example, all the control results are received from the Organizational Entity 202. And the Direct Source for all the control results is Organizational Entity 202.

Both Originating Source and Direct Source provide important information to the entity or entity collection receiving the control results. The owner or administrator of the inheriting entity or entity collection needs to know where the inherited control result is being met, so that the receiving entity or owner/administrator of the receiving entity can determine whether to accept or reject the received control results (e.g. based on the overall compliance posture of the Originating Source). The Originating Source provides this information.

In the case of the Active Directory 210 entity collection, the Originating Source and the Direct Source are the same, since Active Directory 210 is only one level below the Organizational Entity 202. If the two entities were separated by more than one level, then the Originating Source and Direct Source would be different. In addition to inheriting control results from the Organizational Entity 202, Active Directory 210 is publishing the control results as shown in FIG. 5, table 500.

Now, referring to FIG. 5, table 500 shows published control results of the Active Directory entity collection. Column 502 shows control/subcontrol, column 504 shows results, column 506 shows Propagate (results) Externally and column 508 shows Propagate (results) Internally. Entity collections have two options for publishing control results that entities or other entity collections will inherit. As shown in the Propagate Externally column 506, they can publish results to external entities or external entity collections, similar to how the Organizational Entity 202 published its control results. Instead of, or in addition to, entity collections can publish results internally (i.e. to entity collection members, which are frequently used to represent system components), as shown by the "Propagate Internally" column 508 in Table 500, to components (or entities) within their entity collection.

Now, referring to rows 510-522, for each of the controls, the Propagate Internally column has been checked. This means that all control results will be propagated internally to other entities within the entity collection. For example, Active Directory 210 will propagate control results indicated in rows 510-522 to SF Domain Controller 212.

Now, referring to rows 510 and 512, for each of the control results, the Propagate Externally column has not been checked. This means that control results corresponding to rows 510 and 512 will not be propagated externally. On the other hand, referring to rows 514-522, for each of the control results, the Propagate Externally column has been checked. This means that control results corresponding to rows 514-522 will be propagated externally.

The Active Directory 210 entity collection is related to SAP Financial System 206 entity collection as a provider-receiver relationship. This relationship is a different type of relationship from the Parent—Child relationship it has with the Organizational Entity 202. In this example, propagation is enabled for provider-receiver type of relationship. Therefore, the SAP Financial System 206 will inherit control results from both the Organizational Entity 202 and the Active Directory 210 entity collection. More specifically, the SAP Financial System 206 will inherit control results of rows 514 to 522. The SAP Financial System 206 inherited controls are depicted in FIG. 6, table 600.

Now, referring to FIG. 6, table 600 shows the SAP Financial System's inherited controls. Table 600 is similar to table 400 in that Column 602 shows control/subcontrol, column 604 shows results, column 606 shows Originating Source and column 608 shows Direct Source. Now, referring to rows 610 and 612, we notice that results of AC-1.1 and AC-1.2 do not get inherited by the SAP Financial System 206 because the results from this control were only published internally to the Active Directory 210 entity collection, and the SAP Financial System 206 is not internal to the Active Directory 210 entity collection. However, referring to row 614, we notice that control results for AC-2.1 were inherited from Active Directory, as this control result was selected to be propagated externally (as shown in row 514 of table 500) by Active Directory.

The SAP Financial System entity collection is not explicitly publishing any control results. However, since the SAP Financial System 206 is inheriting control results, it will pass through the results to related entities and entity collections for relationships for which propagation has been enabled. Since propagation has been enabled for the Entity Collection (EC)—Member of Entity Collection (Member of EC) relationship, then the SAP Financial System 206 entity collection will propagate its inherited control results to the SAP Server 208 entity. The SAP Server 208 inherited results, then, would be as depicted in FIG. 7, table 700.

Now, referring to FIG. 7, table 700 shows SAP Server 208 inherited controls. Table 700 is similar to table 600 in that Column 702 shows control/subcontrol, column 704 shows control results, column 706 shows Originating Source and column 708 shows Direct Source. Now, referring to rows 710 and 712, since the SAP Financial System 206 did not inherit the AC-1.1 and AC-1.2 control results, and the SAP Financial System did not publish AC-1.1 and AC-1.2 that it met on its own, the SAP Server 208 won't inherit these control results. All other inherited controls and subcontrols for the SAP Server 208 will be the same as for the SAP Financial System entity collection, since the SAP Financial System entity collection did not publish any other controls that other entities or entity collections could inherit.

However, there is one key difference between the control results that were inherited by the SAP Financial System entity collection and those which were inherited by the SAP Server 208. Whereas the Originating Source and Direct Source were the same for the SAP Financial System's inherited results as shown in table 600, they are different for the control results inherited by the SAP Server 208. For the SAP Server 208, the Direct Source for all controls will be the SAP Financial System, as shown in column 708. However, the Originating Source for all of SAP Server's 208 inherited control results is different from the Direct Source. For some control results, the Originating Source is Active Directory and for other control results the Originating Source is the Organizational Entity.

Now, referring to FIG. 8, table 800 shows the SF Domain Controller's 212 inherited control results. Table 800 is similar to table 700 in that Column 802 shows control/subcontrol, column 804 shows the results, column 806 shows Originating Source and column 808 shows Direct Source. The SF Domain Controller 212 will inherit control results from the Active Directory 210 entity collection. These inherited results will appear as shown in Table 800. Just as with the control results shown in table 600 for SAP Server 208, for the SF Domain Controller 212, there is now a difference between the Originating Source and the Direct Source for the control results that are inherited from the Organizational Entity. For example, the Direct Source for all controls will be the Active Directory, as shown in column 808.

In some examples, an entity or entity collection can at any time choose to revoke inherited control results. In some examples, an entity or entity collection may then subsequently unrevoke the previously revoked results, thereby getting the inherited results back. If an entity or entity collection revokes an inherited control result, the entity or entity collection must meet that control on its own. In some examples, controls may be met automatically and sometimes controls may be met manually, for example, by answering a questionnaire. Also, revoking a control result stops the control result from propagating to entities downstream from that entity or entity collection that revoked the control result. For example, the owner of the SF Domain controller revoked a control result that it inherited. Now, referring to FIG. 8A and table 800-1, an example revocation of control result is shown.

Referring now to FIG. 8A, an example table 800-1 is shown. Table 800-1 is similar to table 800 in that Column 802 shows control/subcontrol, column 804 shows results, column 806 shows Originating Source and column 808 shows Direct Source. Table 800-1 further includes a column 810 showing whether a control result has been revoked or not. For example, referring to row 812, we notice that control result for control AC-2.1 has been revoked (or rejected) by the SF Domain Controller. So, in this example, the SF Domain controller must meet the control required for AC-2.1 on its own. If the SF Domain controller had another entity which was a child entity of the SF Domain Controller, and if the SF Domain Controller had published the control result and if propagation was enabled for the parent-child relationship, then the child entity of the SF Domain Controller would receive the control results for AC-2.1 as determined by the SF Domain Controller, and not as determined by Active Directory. In other words, for that entity, the SF domain controller would be the Originating Source and Direct Source for that control result.

In some examples, at any time, a propagating entity can revoke the publishing of a specific control, in which case any of the downstream entities or entity collections which have previously inherited the control result will have this inheritance cancelled, and will now be responsible for meeting the corresponding control on their own.

In some examples, it is possible for an entity or entity collection to inherit multiple results of the same control. When this happens, in some examples, internally propagated results may first take precedence over externally propagated results. In some examples, the control result score with the highest value may be used to meet the entity or entity collection's control. The owner of the inheriting entity or entity collection can override one or more of these default selection, and manually choose a winning control result.

Now, referring to FIG. 9, this figure shows an example relationship table 900. Relationship table 900 may be used to generate a configuration table (for example, as shown in FIG. 2A), to configure attributes for various example relationships. Referring to table 900, column 902 shows "From Type" and column 904 shows "To Type" of a relationship. Column 906 shows a brief description of the relationship. As one skilled in the art appreciates, the relationships shown in table 900 are not exhaustive, and other relationships may be defined, based on the needs of the enterprise.

Figure 10:
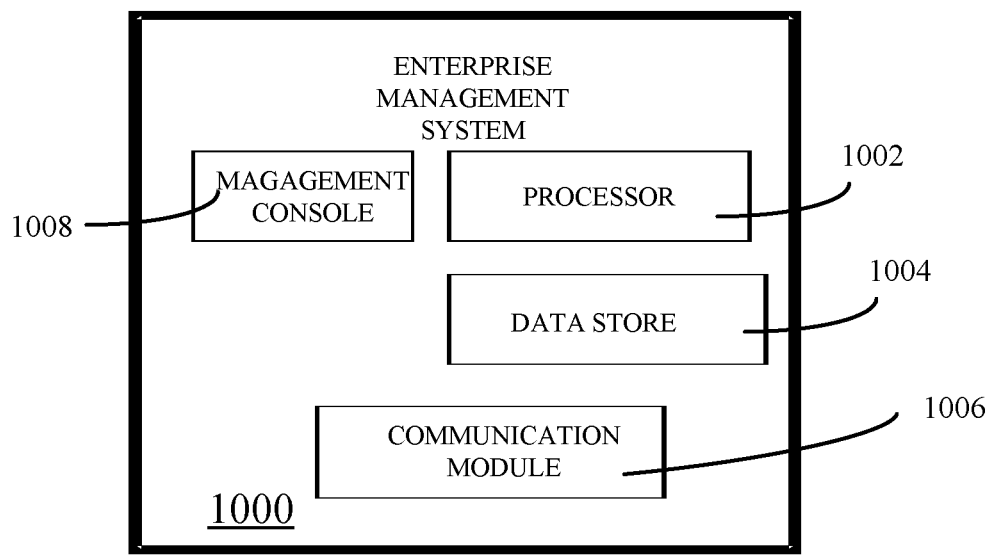

Now, referring to FIG. 10, an example enterprise management system 1000 is shown. The Enterprise Management System 1000 may include a processor module 1002, a data store 1004, a communication module 1006 and a management console 1008. As one skilled in the art appreciates, various modules referenced in this disclosure may be implemented in hardware, software executed on a computing device, or a combination of hardware and software. Additionally, various modules may be implemented as an integrated unit or may be implemented as separate functional units that interact with each other using a communication protocol.

The Processor Module 1000 is configured to perform various arithmetic and logical operations of the Enterprise Management System 1000. The Management Console module 1008 is configured to communicate with users and administrators to configure various attributes of the Enterprise Management System 1000. For example, the Management Console module 1008 may provide an interface accessible over an input device. In some examples, the Management Console module 1008 may provide access to one or more reports to be printed or displayed on an output device. The Data Store 1004 may be used to store transient and permanent data. In some examples, the Data Store 1004 may store one or more tables described in this disclosure. The Communication Module 1006 may be configured to communicate with one or more computing devices over a communication link. For example, various messages and data may be communicated between entities in the enterprise using the Communication Module 1006. Communication Module 1006 may be distributed in multiple entities, so that entities may communicate with each other. For example, the Communication Module 1006 may be configured to propagate control results from one entity to another entity.

Figure 11:
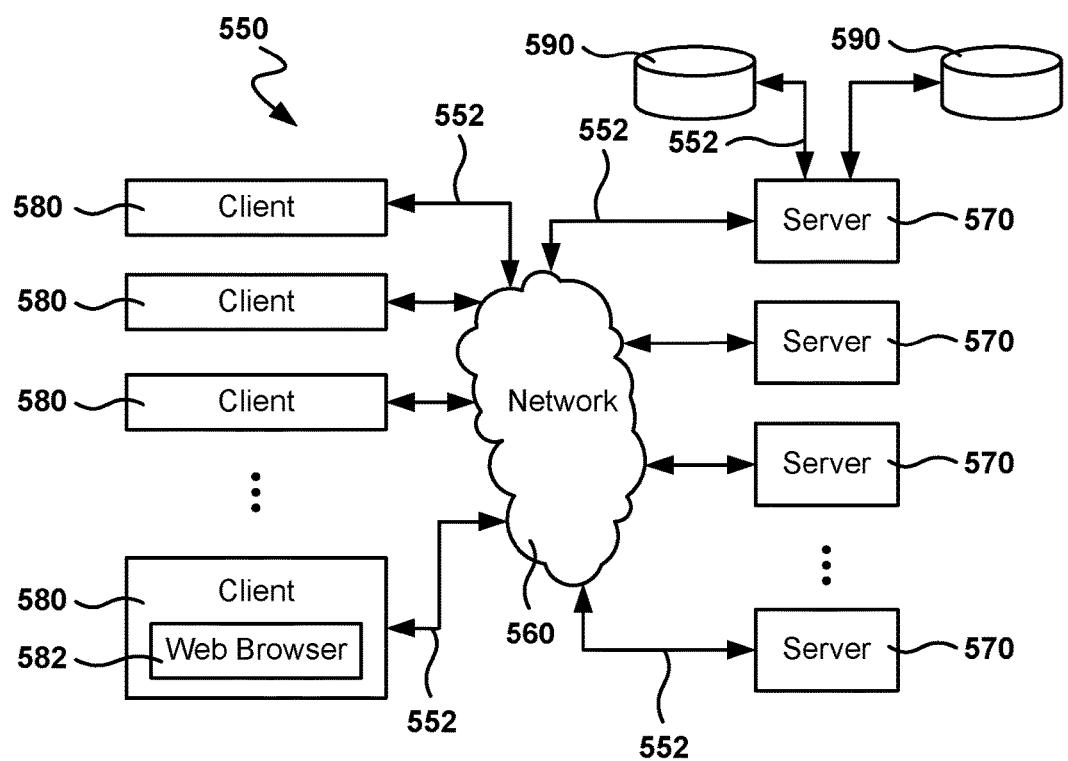

FIG. 11 illustrates an example network environment 550 suitable for implementing embodiments of the invention. Network Environment 550 includes a Network 560 coupling one or more Servers 570 and one or more Clients 580 to each other. Each of the servers and clients may be an entity. A plurality of servers may form an entity collection. A plurality of clients may form an entity collection. A combination of one or more servers and one or more clients may form an entity collection. The Enterprise Management System 1000 may be executed on one or more of the servers or the clients. In particular embodiments, Network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks.

One or more Links 552 couple a Server 570 or a Client 580 to Network 560. In particular embodiments, one or more Links 552 each includes one or more wireline, wireless, or optical links. In particular embodiments, one or more Links 552 each includes an intranet, an extranet, a VPN, a LAN, a WLAN, a WAN, a MAN, a portion of the Internet, or another Link 552 or a combination of two or more such Links 552.

Each Server 570 may be a stand-alone server or may be a distributed system spanning multiple computers or multiple datacenters. Servers 570 may be of various types, such as, for example and without limitation, web server, news server, mail server, message server, advertising server, file server, application server, exchange server, database server, and proxy server. Each Server 570 may include hardware, software, embedded logic components, or a combination of two or more such components for carrying out the appropriate functionalities implemented or supported by Server 570. For example, a web server is generally capable of hosting websites containing web pages or particular elements of web pages. More specifically, a web server may host HTML files or other file types, or may dynamically create or constitute files upon a request, and communicate them to Clients 580 in response to HTTP or other requests from Clients 580. A mail server is generally capable of providing electronic mail services to various Clients 580. A database server is generally capable of providing an interface for managing data stored in one or more data stores.

In particular embodiments, one or more Data Storages 590 may be communicatively linked to one or more Servers 570 via one or more Links 552. Data Storages 590 may be used to store various types of information. The information stored in Data Storages 590 may be organized according to specific data structures. In particular embodiments, each Data Storage 590 may be a relational database. Particular embodiments may provide interfaces that enable Servers 570 or Clients 580 to manage, (e.g., retrieve, modify, add, or delete) the information stored in Data Storage 590.

In particular embodiments, each Client 580 may be an electronic device including hardware, software, or embedded logic components, or a combination of two or more such components, and be capable of carrying out the appropriate functionalities implemented or supported by Client 580. For example and without limitation, a Client 580 may be a desktop computer system, a notebook computer system, a netbook computer system, a handheld electronic device, or a mobile telephone. A Client 580 may enable a network player at Client 580 to access Network 560. A Client 580 may enable its player to communicate with other players at other Clients 580. Further, each Client 580 may be a computing device, such as a desktop computer or a workstation, or a mobile device, such as a notebook computer, a network computer, a tablet computer or a smartphone.

In particular embodiments, a Client 580 may have a Web Browser 582, such as MICROSOFT INTERNET EXPLORER, GOOGLE CHROME, or MOZILLA FIREFOX, and may have one or more add-ons, plug-ins, or other extensions. A user at Client 580 may enter a Uniform Resource Locator (URL) or other address directing the Web Browser 582 to a Server 570, and the Web Browser 582 may generate a Hyper Text Transfer Protocol (HTTP) request and communicate the HTTP request to Server 570. In some embodiments, an application, for example, an enterprise management system, may communicate with the Web Browser 582 and send commands to the Web Browser 582. The Web Browser 582 may generate a Hyper Text Transfer Protocol (HTTP) request and communicate the HTTP request to Server 570. Server 570 may accept the HTTP request and communicate to Client 580 one or more Hyper Text Markup Language (HTML) files in response to the HTTP request. Client 580 may render a web page based on the HTML files from Server 570 for presentation to the user. In some embodiments, the Client 580 may send commands to an application, for example, an enterprise management system, so that the enterprise management system processes the commands and displays the results of the command. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, a reference to a web page encompasses one or more corresponding web page files (which a browser may use to render the web page) and vice versa, where appropriate.

Web Browser 582 may be adapted for the type of Client 580 where the web browser executes. For example, a web browser residing on a desktop computer may differ (e.g., in functionalities) from a web browser residing on a mobile device. A user of an enterprise management system may access the website via Web Browser 582.

Figure 12:
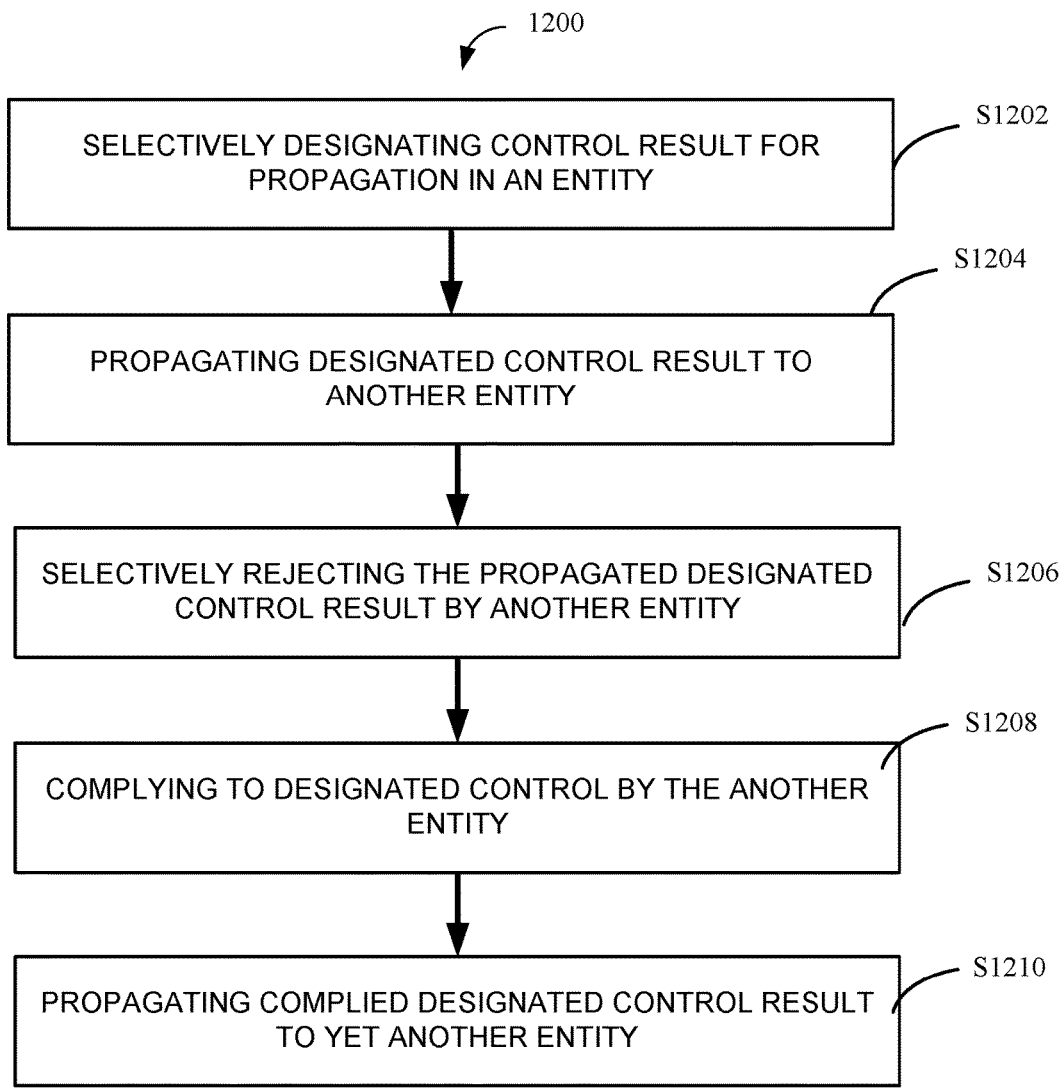

Now, referring to FIG. 12, an example flow diagram 1200, according to an example implementation will now be described. In block S1202, a control result is selectively designated for propagation in an entity. For example, referring to table 230 (FIG. 2A), control results are designated for propagation, based on a relationship. Further, referring to table 300 (FIG. 3), control results selectively designated for propagation by an Organizational Entity are shown. Similarly, referring to table 500, control results selectively designated for propagation by the Active Directory entity collection, for both internal and external propagation, are shown. These tables may be configured using the Enterprise Management System 1000. For example, using the Management Console module 1008, an input screen may be presented to a user to configure the tables. The configured tables may be stored in the Data Store 1004. In some examples, a configuration table 230 may be presented for user input and stored in the data store 1004. As previously described, the configuration table may provide information related to propagation of control results based on a relationship between entities.

In block S1204, the designated control result is propagated to another entity. As previously described, based on the selection, the designated control result is propagated to another entity. In one example, the designated control result is propagated based on the type of relationship between the entities. As previously described, control results may be propagated based on a Parent-Child relationship, Provider-Receiver relationship, and the like. In some examples, the Communication Module 1006 of Enterprise Management System 1000 may communicate and propagate the control result to other entities, based on the relationship and the propagation configuration.

In block S1206, the propagated designated control result may be selectively rejected by another entity. For example, as previously described with reference to FIG. 8A, table 800-1 and row 812, the SF Domain Controller entity rejected the designated control result for control AC-2.1.

In block S1208, the designated control is complied by another entity. For example, the SF Domain Controller entity complies on its own to control AC-2.1.

In block S1210, the complied designated control result is propagated to another entity. Referring back to FIG. 8A, if the SF Domain Controller entity had a Parent-Child relationship with another entity, the control result for control AC-2.1 that the SF Domain Controller rejected and met on its own would be propagated to the child of the SF Domain Controller entity if the SF Domain Controller published the control results for AC-2.1.

Although the present disclosure provides examples for implementation of selective propagation of control results, the teachings of this disclosure may be used for selective propagation of risk scores and criticality based on relationships. Further, the teachings of this disclosure may be applied for an organization which may include a combination of computing devices and non-computing devices. Some examples of non-computing devices may include facilities, business units, people and processes. Some examples may provide management of an enterprise that has any combination of multiple entities, multiple control frameworks and multiple relationships.

As enterprises become more complex and the number of controls the enterprise may be subject to based on various regulatory further increases, security and other requirements become even more complex to manage. By providing a selective propagation of control results as described in this disclosure, an enterprise may be efficiently evaluated for compliance. Selective propagation of control results in some examples removes redundant compliance by a plurality of entities which may be related.

As an example, an entity collection like an Active Directory entity collection may be used to provide a number of authentication and authorization services to a number of entities and entity collections within an enterprise. If the Active Directory entity collection is compliant to one or more controls related to authentication and authorization services, one or more compliance results at the Active Directory entity collection may be used to confirm compliance related to authentication and authorization services at all other entities and entity collections within the enterprise whose access is controlled by the Active Directory entity collection. By the selective propagation of control results to all other entities and entity collections within the enterprise that rely upon Active Directory, there is no need for each of the entities to separately measure and confirm compliance to controls related to authentication and authorization from Active Directory. This saves time and ultimately money, while reducing the chances of error, and increasing the granularity of reporting that an enterprise may be able to leverage in order to gain more insight into the effect that compliance or non-compliance of specific controls has on the enterprise's overall compliance and risk postures.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A computer implemented method for propagating control result in an enterprise, including:
    designating at least one control for compliance by an entity in the enterprise;
    measuring the at least one control for compliance, the measuring generating a control result corresponding to the at least one designated control, the generated control result stored in a data store of an enterprise management system executed on a computing device;
    selectively designating the generated control result corresponding to the at least one designated control for propagation, by the entity, in the data store of the enterprise management system; and
    propagating the designated generated control result corresponding to the at least one designated control to another entity by the enterprise management system, based on the selective designation for propagation.

2. The method of claim 1, further including designating propagation of control result corresponding to the at least one designated control is based on a relationship between the entity and the another entity.

3. The method of claim 2, wherein the entity and the another entity has a Parent-Child relationship.

4. The method of claim 2, wherein the entity and the another entity has a Provider-Receiver relationship.

5. The method of claim 1, further including selectively rejecting the propagated control result corresponding to the at least one designated control and complying with the at least one designated control by the another entity, instead of accepting the propagated designated control result, the compliance by the another entity resulting in another control result.

6. The method of claim 5, further including propagating the another control result of the complied at least one designated control by the another entity to yet another entity.

7. The method of claim 6, wherein propagating the another control result to yet another entity is based on a relationship between the another entity and yet another entity.

8. The method of claim 1, wherein the enterprise includes at least one network environment, with a plurality of computing devices coupled over the network environment.

9. The method of claim 1, further including the another entity receiving designated control results from a plurality of entities and selecting one of the received designated control results by the another entity.

10. The method of claim 1, further including:
selectively accepting the propagated designated control result corresponding to the at least one designated control by the another entity;
subsequently revoking the propagation of control result corresponding to the at least one designated control by the entity to the another entity; and
independently complying with the at least one designated control by the another entity based on the revocation of the propagated control result.

11. A computer implemented system to propagate control results in an enterprise, including:
at least one control for compliance is designated for an entity in the enterprise;
compliance to the at least one control results is measured to generate a control result that corresponds to the at least one designated control, the generated control result is stored in a data store of an enterprise management system;
the generated control result that corresponds to the at least one designated control is selectively designated for propagation, by the entity, in the data store of the enterprise management system; and
the enterprise management system is configured to propagate the designated generated control result that corresponds to the at least one designated control to another entity, based on the selective designation for propagation.

12. The system of claim 11, wherein the designation of the control result that corresponds to the at least one designated control for propagation is based on a relationship between the entity and the another entity.

13. The system of claim 12, wherein the entity and the another entity have a Parent-Child relationship.

14. The system of claim 12, wherein the entity and the another entity have a Provider-Receiver relationship.

15. The system of claim 11, wherein the another entity selectively rejects the propagated designated control result that corresponds to the at least one designated control, instead of accepting the propagated designated control result and complies to the at least one designated control, the compliance by the another entity results in another control result.

16. The system of claim 15, wherein the another entity propagates the another control result of the complied at least one designated control by the another entity to yet another entity.

17. The system of claim 16, wherein the propagation of the another control result to yet another entity is based on a relationship between the another entity and yet another entity.

18. The system of claim 12, wherein the enterprise includes at least one network environment, with a plurality of computing devices coupled over the network environment.

19. The system of claim 12, wherein the another entity receives designated control results from a plurality of entities and the another entity selects one of the received designated control results to meet the control.

20. The system of claim 11, wherein,
the another entity selectively accepts the propagated designated control result that corresponds to the at least one designated control;
the entity subsequently revokes the propagation of control result corresponding to the at least one designated control by the entity to the another entity; and
the another entity independently complies with the at least one designated control based on the revocation of the propagated control result.

* * * * *